United States Patent [19]

Kassai

[11] 4,046,401
[45] Sept. 6, 1977

[54] FOLDING BABY CARRIAGE

[75] Inventor: Kenzou Kassai, Higashishimizu, Japan

[73] Assignee: Kassai Kabushikikaisha, Osaka, Japan

[21] Appl. No.: 689,463

[22] Filed: May 24, 1976

[30] Foreign Application Priority Data

Dec. 4, 1975 Japan ................................ 50-145550

[51] Int. Cl.² ............................................ B62B 11/00
[52] U.S. Cl. ................................................... 280/650
[58] Field of Search ............... 280/647, 649, 650, 641, 280/642, 644

[56] References Cited

U.S. PATENT DOCUMENTS

| 3,084,949 | 4/1963 | Forster | 280/650 |
| 3,556,546 | 1/1971 | Garner | 280/644 |
| 3,836,164 | 9/1974 | Sugino | 280/642 |

Primary Examiner—Robert R. Song
Attorney, Agent, or Firm—Browdy and Neimark

[57] ABSTRACT

A highly safe folding baby carriage which can be opened or folded by a simple operation. The baby carriage includes a pair of front legs, a pair of rear legs pivotally connected to the front legs and a pair of supporting bars which are connected backwardly rotatable to the top of the front legs. Three pairs of connecting bars are provided. Respective first ends of which are pivotally connected to the front legs, the rear legs, or supporting bars respectively. A pivoting bar pivotally connects all of the other ends of three pairs of connecting bars. The pivoting bar makes the carriage stable in its opened state, being in contact with the back faces of the rear legs.

1 Claim, 8 Drawing Figures

FIG. 3
FIG. 4
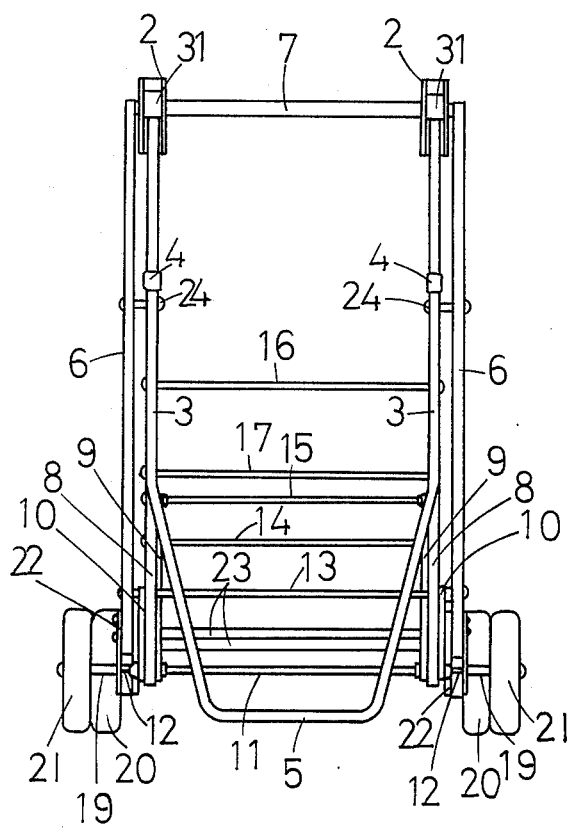
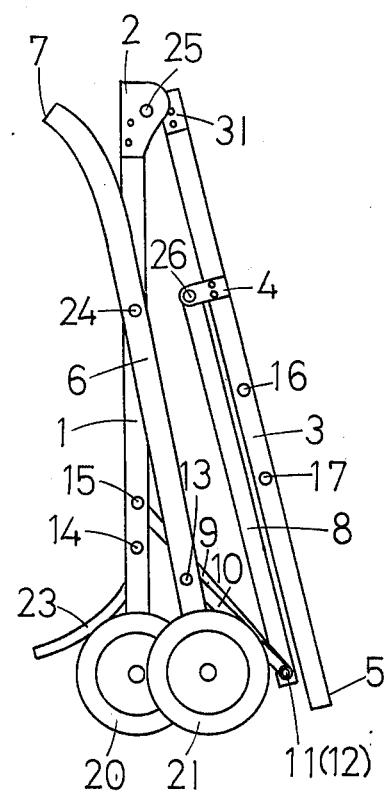

4,046,401

FOLDING BABY CARRIAGE

BACKGROUND OF THE INVENTION

The present invention relates to a folding baby carriage.

Generally, the folding baby carriages have advantages that they are convenient in utilizing traffic facilities and they do not need a large space to lay away. However, there are some problems in conventional folding baby carriages that they happen to be folded unexpectedly or that the opening and folding operation of them are quite troublesome.

SUMMARY OF THE INVENTION

It is an object of the present invention to provide a folding baby carriage which is of high safety and can be opened or folded by a simple operation.

In the folding baby carriage according to this invention, a pivoting bar which pivotally connects all of the other ends of three pairs of connecting bars is transversely provided so that it may be in contact with the back faces of the rear legs in an opened state. The carriage is maintained quite stable in an opened state by the pivoting bar.

BRIEF DESCRIPTION OF THE DRAWINGS

FIG. 3 is a rear elevation of the carriage in a folded state.

FIG. 4 is a side elevation of the carriage in a folded state.

DETAILED DESCRIPTION OF PREFERRED EMBODIMENT

The present invention is described in detail hereinafter with reference to the drawings.

Figure 7:
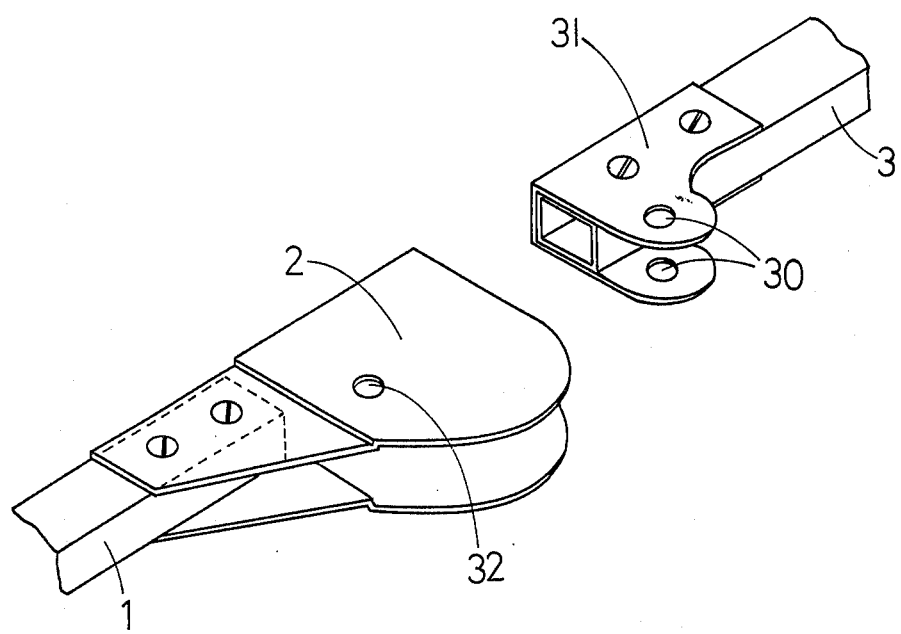
FIG. 7 is an enlarged and exploded perspective view of the rotational joint of the carriage.

In the drawings, rotatable joints 2,2 are provided at one end of the bar leg members 1,1, and U-shaped supporting members 3,3 are pivotally mounted at the joints. The rotatable joint 2 is illustrated particularly in FIG. 7. An attachment 31 having a hole 30 is provided at the end of the supporting member 3, and is inserted into the joint 2 provided at the leg member 1 to be rotatably mounted by the hole 30 and a hole 32. As the bars of the leg member 1 and the supporting member 3 are same in shape, the joint 2 is made large in thickness enough to be inserted by the attachment 31. Joints of various shapes and modifications can easily be made from plastics. Attachments 4,4 are provided at a position slightly above the joint-connecting portions 2,2 of the supporting members 3,3 to be pivotally mounted connecting rods 8,8. The center portion of the supporting members 3,3 forms a handle 5. Leg members 6,6 are pivotally mounted at the center portion of the leg members 1,1. The leg members 6,6 are made by forming a bar into U-shape where the center portion forms a protecting portion 7. Connecting rods 9,9 are pivotally mounted at a position beneath a pivoting shaft 24 of the leg members 1,1, and connecting rods 10,10, beneath the leg members 6,6. The connecting rods 9,9,10,10 and 8,8 are brought together and are rotatably supported by a shaft 11. The shaft 11 is protruded outwardly at the both ends to form stoppers. Reinforcements 13, 14, 15, 16, 17 are provided transversely at suitable positions of the supporting members 3,3 and the leg members 1,1,6,6. A footrest 23 is provided at the reinforcement 14. The reinforcements 13,15 act as pivoting shafts 13,15. Wheels 20,20,21,21 are provided at the leg members 1,1,6,6. Numerals 18,19 designate front and rear axles.

Figure 1:
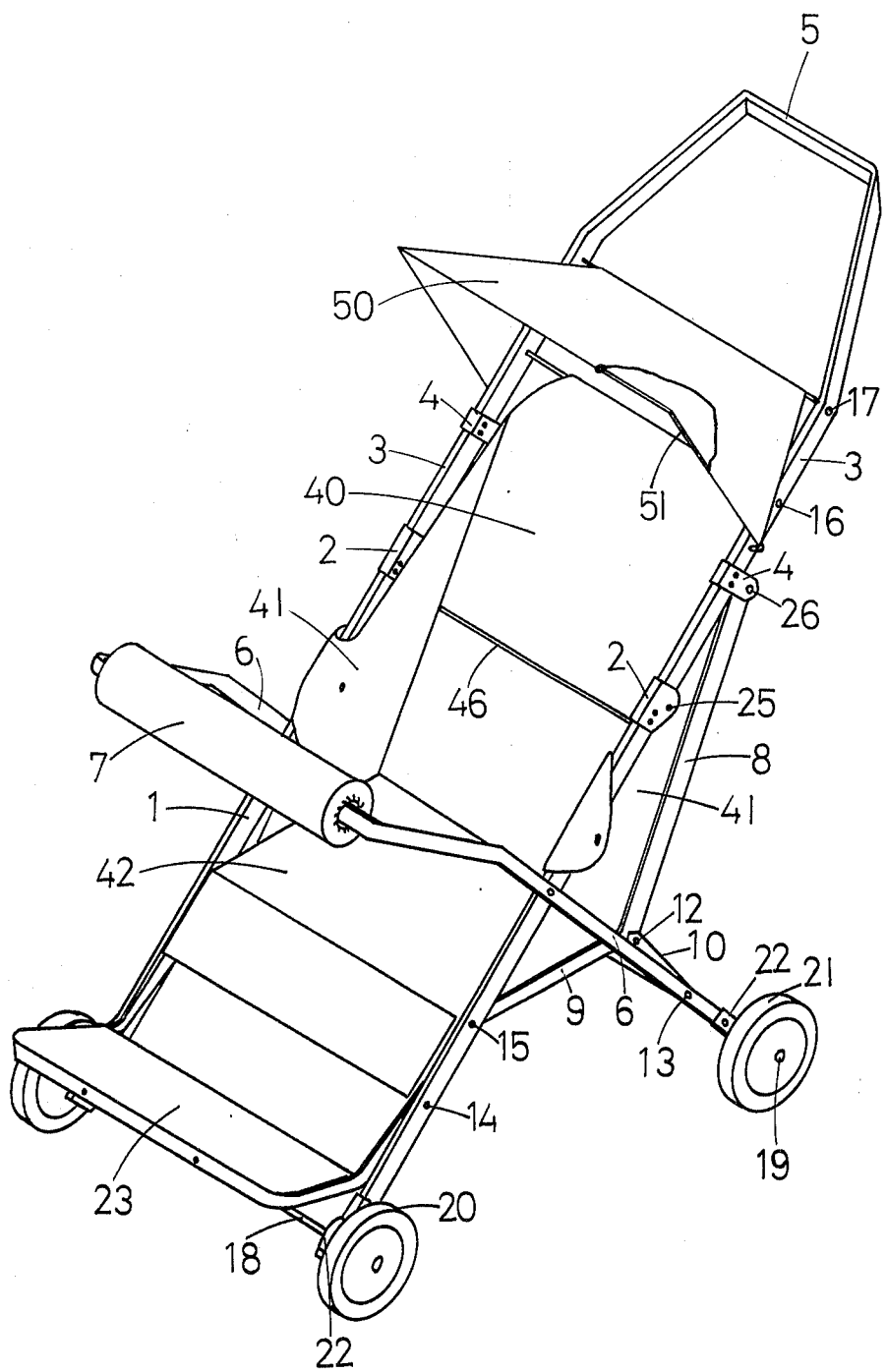
FIG. 1 is a perspective view of a folding baby carriage in an opened state which is one embodiment of the present invention.
Figure 2:
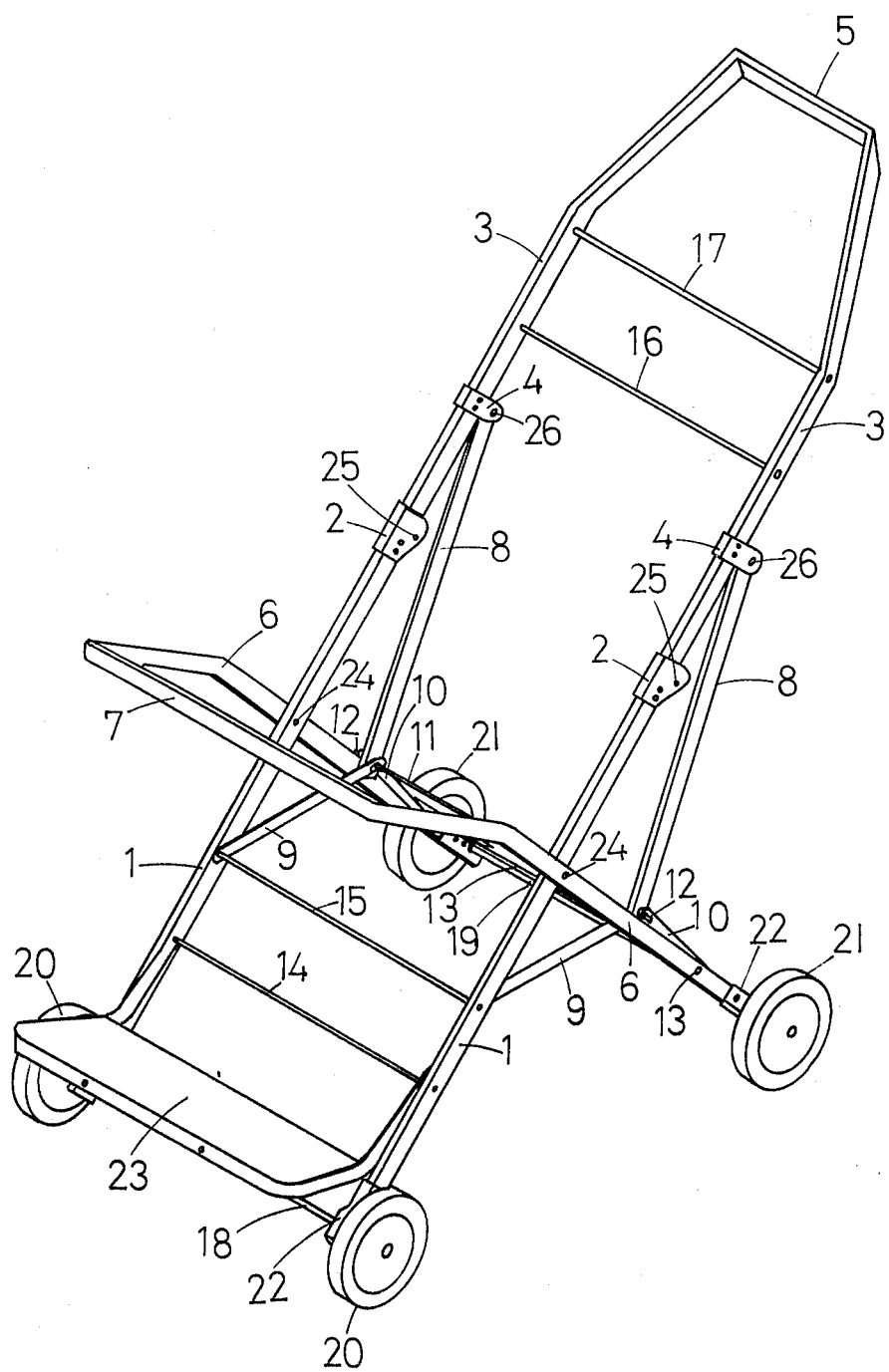
FIG. 2 is a perspective view of a framework of the carriage in an opened state.
Figure 8:
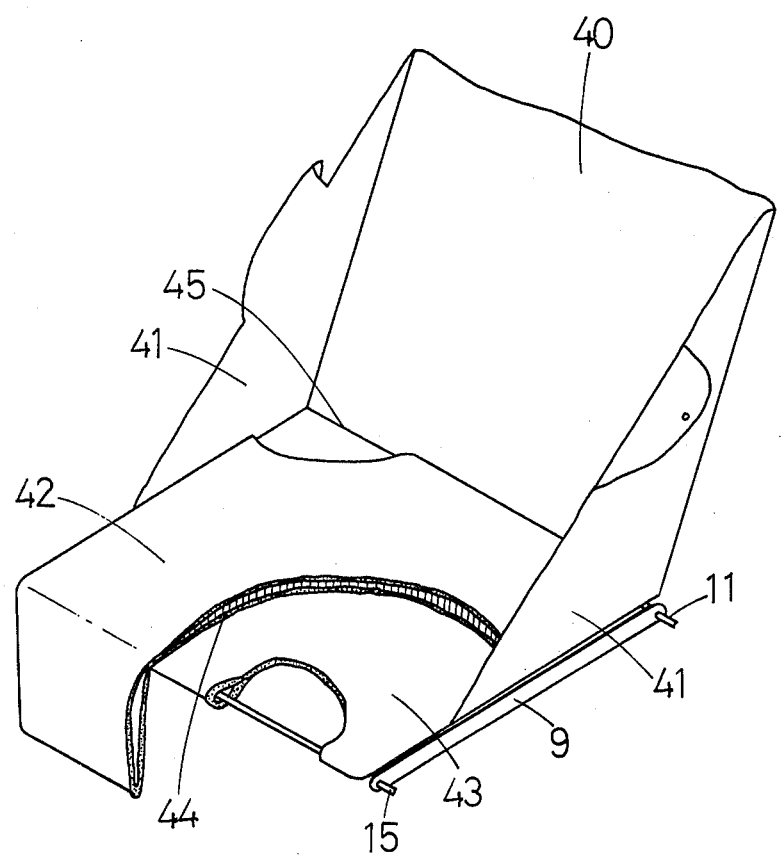
FIG. 8 is an enlarged perspective view of the seat of the carriage.

FIG. 8 shows the seat which consists of a back portion 40, side protions 41,41, and a bottom portion 43. A mat 42 containing a plate 44 is sewed to a corner 45 of the seat. The upper end of the seat is fitted to the reinforcement 16, the both side portions to the leg member 1,1 and the bottom portion 43 to the reinforcement 15. As the mat 42 contains the plate 44, the mat 42 is placed on the shaft 11 and the reinforcement 15 in use, which is good in strength. The protecting portion 7 is fitted with elastic materials such as sponge. Numeral 46 in FIG. 1 designates a folding line which renders the openning and closing operation of the baby carriage to be smooth. Numerals 50 and 51 designate a hood and a hood supporting shaft respectively.

Referring to FIG. 3 and FIG. 4 which show the folded state, the front wheel 20 approaches the rear wheel 21 so that the periphery of the front wheel 20 contacts with the axle of the rear wheel 21, the supporting member 3 folds downward, and the connecting rod 8 is parallel to the supporting member 3. Opening the baby carriage to bring into use condition is carried out in a manner such that one holds the handle 5 and gives vibration to the baby carriage, swinging up and down slightly, while pulling up the supporting member 3. When one opens the baby carriage with both hands, one hand holds the protecting portion 7 and the other hand holds the handle 5 to pull up the supporting member 3.

Figure 5:
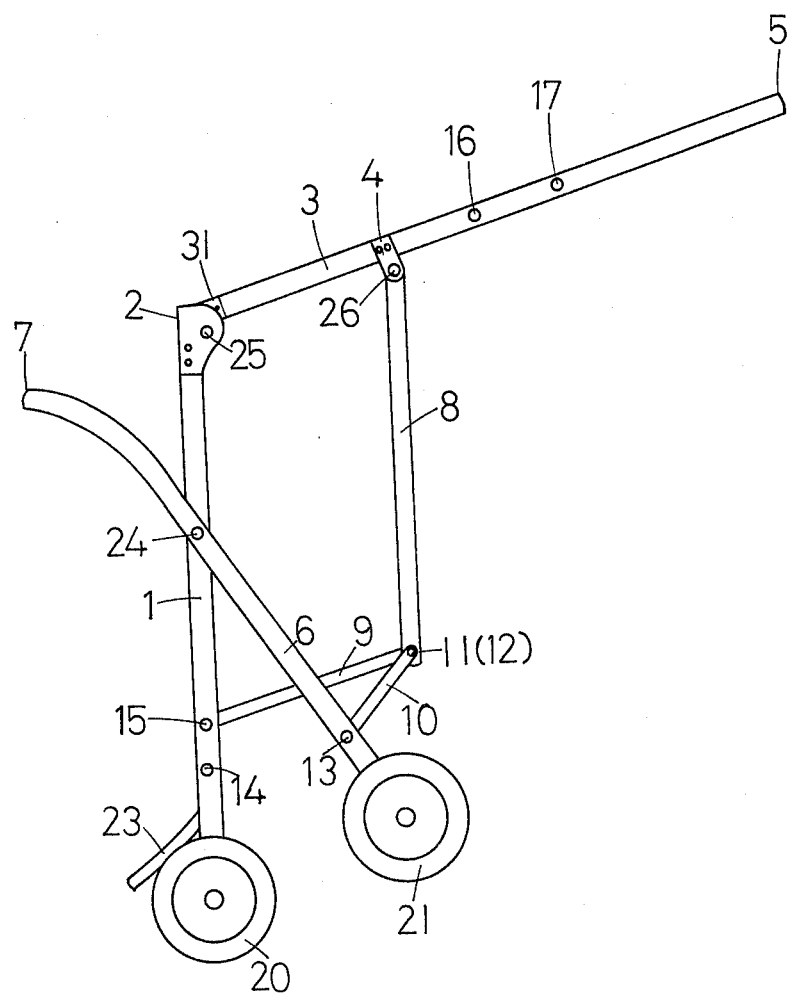
FIG. 5 is a side elevation of the carriage in the way of folding operation.
Figure 6:
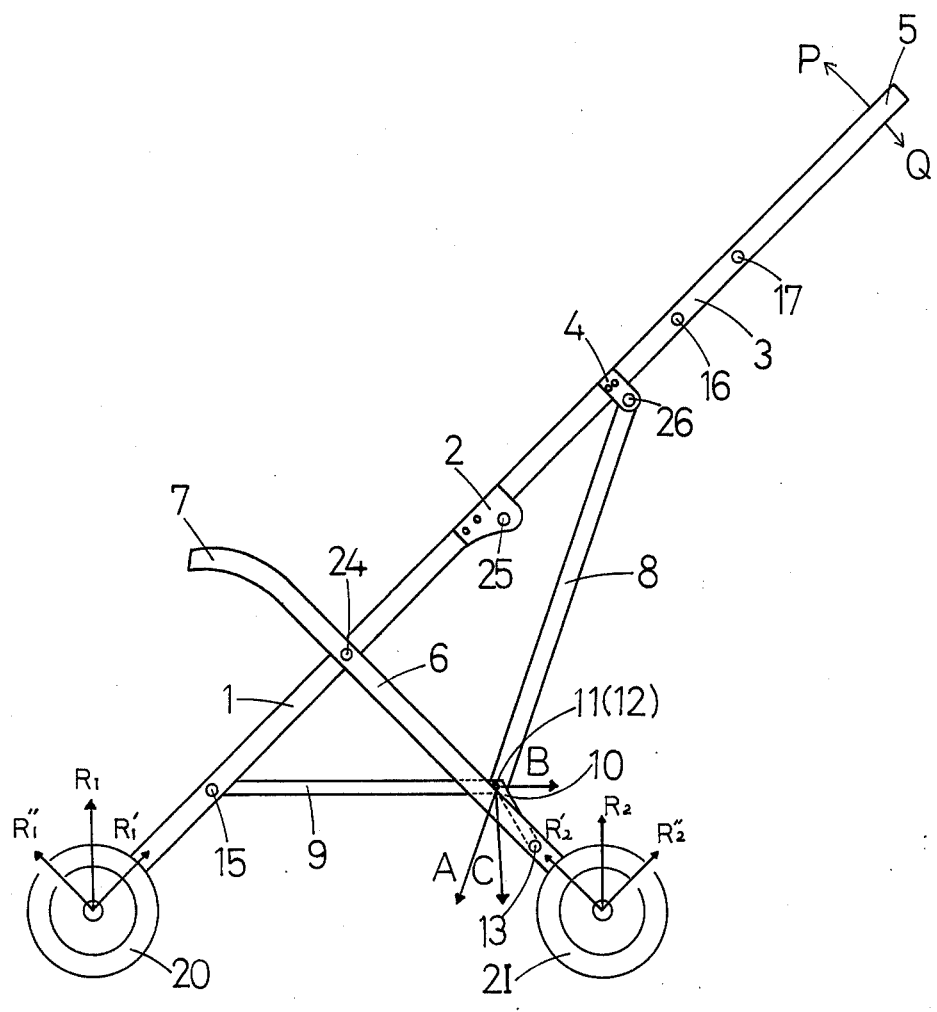
FIG. 6 is a side elevation of the carriage in an opened state.

When the leg member 1 is fixed and the supporting member 3 is pulled up, the supporting member rotates with the shaft 24 as the center. The connecting rod 8 moves upward on an orbit, and the connecting rods 9,10, accordingly, move to stand up. The leg member 6 moves, depending upon movement of th connecting rod 10. In other words, the leg member 6 moves in the direction to increase an angle against the leg member 1. This state is shown in FIG. 5. When the supporting member 3, further, rotates, the connecting ros 8,10 move beyond a straight line and the shaft 11 moves beyond a change point. Thus, the opening state is reached, as shown in FIG. 6. In this state, the stopper 12 lies on the leg member 6, and further opening does not occur. This state is stable and is never closed in usual use.

Accordingly, the baby carriage of the present invention needs not lock, for both front and rear wheels contact with the ground, in usual use. As far as the both front and rear wheels contact with the ground, weight of baby and baby carriage, finally, ballances with resistance $R_1$, $R_2$ from the ground. The resistance can be divided into force in the direction of the leg member $R_1'$, $R_2'$ and rotation moment $R_1''$, $R_2''$. Rotation moment $R_1''$, $R_2''$ is negligible, since it acts in the direction of opening and is stopped by stopper.

Furthermore, cases in which the rear wheels are separated from the ground force being imposed in the direction of arrow P, or the front wheels are separated from the ground, force being imposed in the direction of arrow Q, should be considered. In the former case, the supporting member 3 rotates in the direction of P with the shaft 25 as the center, the connecting rod 8 move upward, and the shaft 11 is pulled in the direction of axis of the connecting rod 8. The baby carriage is closed only when the leg member 6 rotates with the shaft 24 as the center in the direction in which the rear wheels approach the front wheels. The baby carriage can be closed, only when the shaft 11 moves downward. For this reason, it is understood that the baby carriage is never closed in the above case.

In the case that the front wheels separate from the ground, force being imposed in the direction of arrow Q, the shaft 11 is imposed force A downward by the connecting rod 8. Since force B imposed upon the shaft 11 by the connecting rod 9 is considered to be extremely small, compared with force A, resultant force C is imposed on the left side of the connecting rod 10 in FIG. 6. The resultant force C is imposed in the direction of stopping so that the baby carriage is never closed.

In various vibration or shock in use, the baby carriage is never closed unexpectedly, since the shaft 11 is stopped at a position, rotated beyond the change point. The baby carriage can easily closed in a manner such that one puts one foot on the footrest 23 and pull up the protecting portion 7 upward to contact the rear wheels with the front wheels.

As above mentioned, the baby carriage of the present invention is very easy in operation of openning an closing. Openning of the baby carriage can be carried out by stretching arm downward to hold the handle 5, without squating down. It needs not lock. Closing of the baby carriage can be done instantly by putting one foot on the footrest and putting up the protecting portion. Accordingly, the baby carriage of the present invention is useful especially when riding traffic, since one can instantly carry out operation of openning and closing with baby or infant in arm. The baby carriage of the present invention has no possibility to close unexpectedly in use, and has very higher safety.

What is claimed is:

1. A folding baby carriage comprising:
    a pair of front leg members provided with front wheels rotatably mounted on lower ends thereof;
    a pair of rear leg members pivotally connected to said front leg members and provided with rear wheels rotatably mounted on lower ends thereof, said rear legs being a first U-shaped bar having a center portion which forms a protecting portion;
    a pair of supporting bars which are connected backwardly rotatable to upper ends of said front leg members by rotatable joints, said supporting bars being a second U-shaped bar having a center portion which forms a handle;
    a pair of first connecting bars respective first ends of which are pivotally connected to said front leg members by a first reinforcement bar positioned transversely between said front leg members;
    a pair of second connecting bars respective first ends of which are pivotally connected to said rear leg members by a second reinforcement bar positioned transversely between said rear leg members;
    a pair of third connecting bars and attachment means, first ends of said pair of said third connecting bars being pivotally connected to said pair of supporting bars by said attachment means; and
    a pivoting bar pivotally connecting all other ends of said pairs of first, second and third connecting bars.

* * * * *